United States Patent [19]

Abshire et al.

[11] Patent Number: 4,806,732
[45] Date of Patent: Feb. 21, 1989

[54] MULTI-POWER LASER SEAM TRACKING SYSTEM

[75] Inventors: James B. Abshire, Laurel; Peter L. Fuhr, Greenbelt, both of Md.

[73] Assignee: Caterpillar Inc., Peoria, Ill.

[21] Appl. No.: 49,495

[22] Filed: May 14, 1987

[51] Int. Cl.⁴ .............................................. B23K 9/12
[52] U.S. Cl. ............................. 219/124.34; 219/130.01
[58] Field of Search ....................... 219/124.34, 130.01; 901/42

[56] References Cited

U.S. PATENT DOCUMENTS

| | | | |
|---|---|---|---|
| 3,135,857 | 1/1960 | Voros | 219/125 |
| 4,306,144 | 12/1981 | Masaki | 250/202 |
| 4,473,750 | 9/1984 | Oshida et al. | 250/560 |
| 4,614,868 | 9/1986 | Alster | 250/227 |

FOREIGN PATENT DOCUMENTS

| | | | |
|---|---|---|---|
| 60-32485 | 2/1985 | Japan | 219/124.34 |
| WO84/01731 | 5/1984 | PCT Int'l Appl. | |

*Primary Examiner*—Clifford C. Shaw
*Attorney, Agent, or Firm*—Stephen L. Noe

[57] ABSTRACT

Scanning devices are commonly utilized in conjunction with automatically guided welding systems in order to interpret the location and other characteristics associated with a groove to be welded. Many such systems utilize lasers as a source of radiant energy. The instant invention includes a sensing circuit for detecting radiant energy produced by the arc of a welding torch and producing first and second status signals in response to the respective absence and presence of the arc. A logic circuit produces a first power command signal in response to receiving the first status signal and a second power command signal in response to receiving the second status signal. A radiant energy emitting device controllably produces radiant energy having a first relatively low power level in response to receiving the first power command signal and a second relatively high power level in response to receiving the second power command signal. The radiant energy emitting device is also advantageously maintained at a relatively constant temperature in order to prevent thermal drift of the energy source.

5 Claims, 3 Drawing Sheets

MULTI-POWER LASER SEAM TRACKING SYSTEM

DESCRIPTION

1. Technical Field

This invention relates generally to an apparatus and method for controlling a laser associated with a scanning apparatus, and more particularly, to an apparatus and method for controlling the power associated with a laser operating in conjunction with a scanning apparatus used for seam tracking in a welding system.

2. Background Art

The utility of automatic and adaptive weld guidance systems is well recognized in the industry today. Such automatically guided welding systems have the potential to decrease an otherwise labor intensive manufacturing operation. In addition, automatically guided welding systems can provide consistent, high quality welds when used in appropriate applications.

A basic requirement for automatically guided welding systems is a means for sensing the position, and in some instances the configuration, of the groove about which the weld is to occur. Such sensing devices can assume a variety of configurations, for example, mechanical probes, structured light sources, and camera recording devices. In the case of optical systems, lasers are frequently used to illuminate, whether by visible light or otherwise, the desired area of the workpiece. This permits taking advantage of the various unique characteristics of lasers, including the production of coherent light having a single discrete frequency.

The current generation of laser diodes is capable of producing sufficient radiant energy to permit use in an automatically guided welding system. Incorporation of a laser diode into such a scanning and guidance system permits varying the level of radiant energy emitted by the lasing device. Simply altering the amount of current flowing through the laser diode correspondingly modifies the amount of radiation emitted from the diode. This ability to easily adjust emitted power offers the opportunity to improve laser systems by lengthening the life of the lasing device and by reducing unnecessary emission from the laser.

The present invention is directed to over-coming one or more of the problems set forth above.

DISCLOSURE OF THE INVENTION

In one aspect of the present invention, a scanning apparatus for use with an adaptive welding system is provided. The welding system includes a welding torch adapted to produce an arc and a welding torch logic control for controllably operating the welding torch. A sensor detects radiant energy produced by the arc and produces first and second status signals in response to the respective absence and presence of the arc. A logic circuit produces a first power command signal in response to receiving the first status signal and a second power command signal in response to receiving the second status signal. An emission control circuit controllably produces radiant energy having a first power level in response to receiving the first power command signal and a second power level in response to receiving the second power command signal.

In a second aspect of the present invention, a method for controlling a scanning apparatus used with a adaptive welding system is provided. The adaptive welding system includes a welding torch adapted to produce an arc and a welding torch logic control for controllably operating the welding torch. The method includes the steps of sensing the radiant energy produced by the arc and producing first and second status signals in response to the respective sensed absence and presence of the arc. The method further includes the steps of producing a first power command signal in response to receiving the first status signal and a second power command signal in response to receiving the second status signal and controllably producing radiant energy having a first power level in response to receiving the first power command signal and a second power level in response to receiving the second power command signal.

The present invention provides a scanning apparatus for use with an adaptive welding system in which the power level of the radiant energy delivered from an emitting device is advantageously varied in response to the presence or absence of an arc produced by the welding torch.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
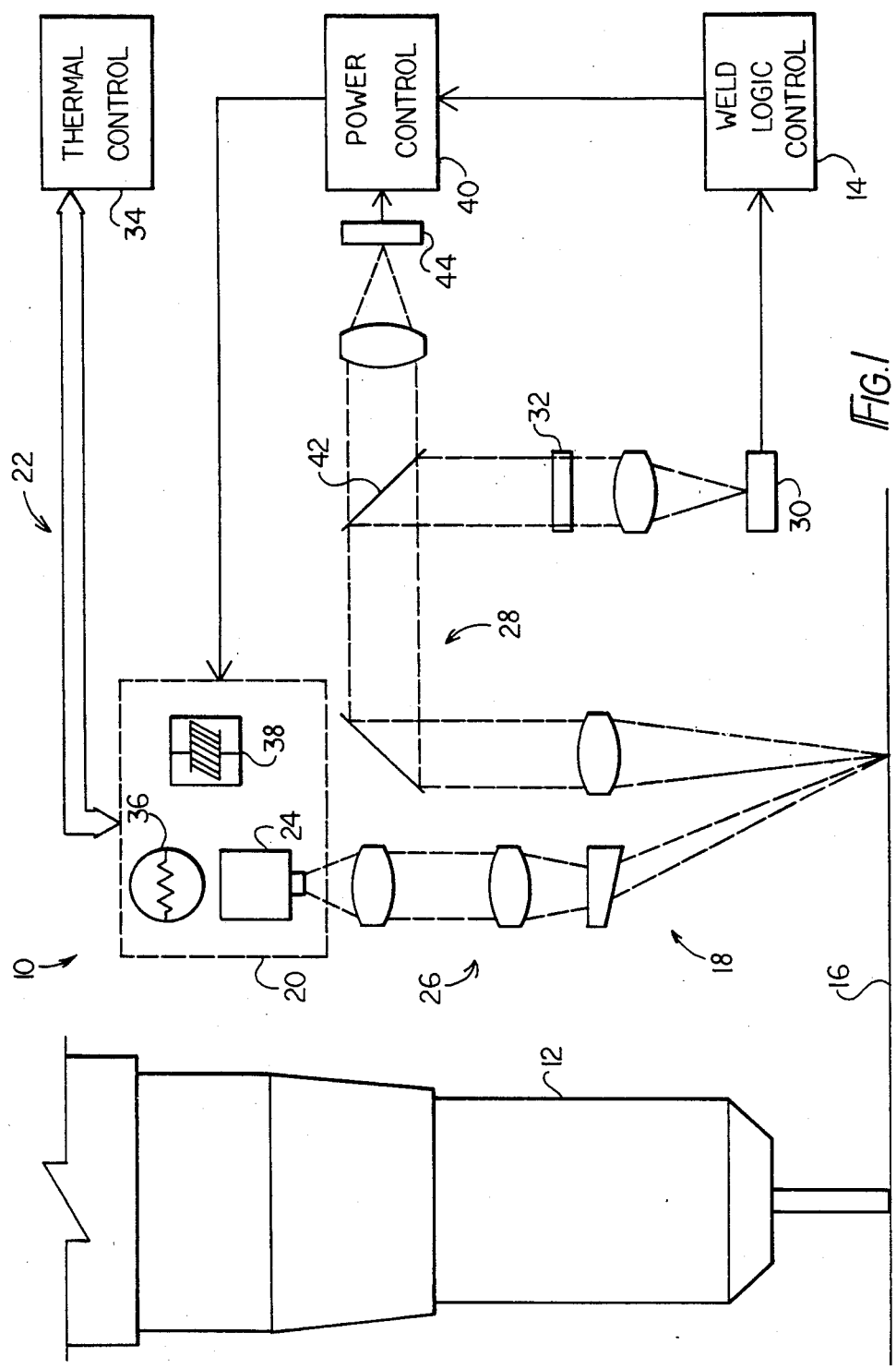
FIG. 1 is a schematized block diagram of a scanning apparatus incorporating a welding torch in an adaptive welding system.

Referring first to FIG. 1, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

In FIG. 1, a welding control apparatus 10 is shown to include a welding torch 12 adapted to produce an arc, and a welding torch logic control 14 for controllably operating the welding torch 12. The actual operation of the welding torch 12 and associated logic control 14 is not relevant to the invention, and is well understood in the applicable field of art. In general, the welding torch 12 is connected to a source of electrical energy and produces an arc when a electrode associated with the torch 12 is positioned proximate a workpiece 16. The torch position, electrical operation, and other basic control functions are generally handled by the welding logic control 14.

In order to provide information relating to guidance and groove configuration to the welding torch logic control 14, a scanning apparatus 18 is required. The scanning apparatus 18 includes, for example, a source of radiant energy 20. The radiant energy source 20 is part of an overall emitter means 22 for controllably producing the radiant energy necessary to illuminate the workpiece 16. The source of radiant energy 20 typically includes a laser 24, for example, a laser diode, adapted to produce coherent light having a predetermined wavelength or frequency. The radiant energy emitted by the laser 24 is passed through a first optical system 26 and focused on the workpiece 16. The radiant energy reflected from the workpiece 16 is collected by a second optical system 28 and ultimately delivered to an image sensor 30, for example, a linear array or other form of radiator position sensing device. The image delivered from the workpiece 16 is then delivered to the weld logic control 14 and is used to provide guidance, fill, and other information necessary for proper control of the welding torch 12.

Owing to the fact that the wavelength of the radiant energy emitted from the laser 24 is substantially constant, such welding control systems can incorporate an optical filter 32 to block much ambient light that passes through the optical system 28. The more precisely the laser wavelength can be maintained the more narrow the passband of the filter 32 can be, decreasing the amount of spurious radiation received by the welding logic control 14. Since the laser wavelength in the case of a laser diode is somewhat temperature dependent, it is advantageous to include a laser thermal control unit 34 in the scanning apparatus 18. The thermal control unit 34 is connected to the radiant energy emitting system 20 and receives input signals from a temperature sensor 36. In response to sensing a deviation in the temperature of the environment in which the laser 24 operates, the thermal control unit 34 automatically adjusts the temperature via a thermal-electric cooler 38, also known as a Peltier cooler.

Finally, a laser power control unit 40 is also connected to the radiant energy source 20. The second optical system 28 collects both coherent laser energy containing desirable position information, and undesirable radiant energy emitted from the environment of the welding operation, especially that produced by the electrical arc that results from the welding operation. Spurious light emitted from the arc and other ambient radiant energy received by the optical system 28 passes through a dichromatic mirror 42 and is received by a detector means 44. The detector means 44 is connected to the laser power control 40 and delivers first and second status signals responsive to the absence and presence of the welding arc. Responsively, the laser power control 40 adjusts the power delivered by the laser 24.

Figure 2:
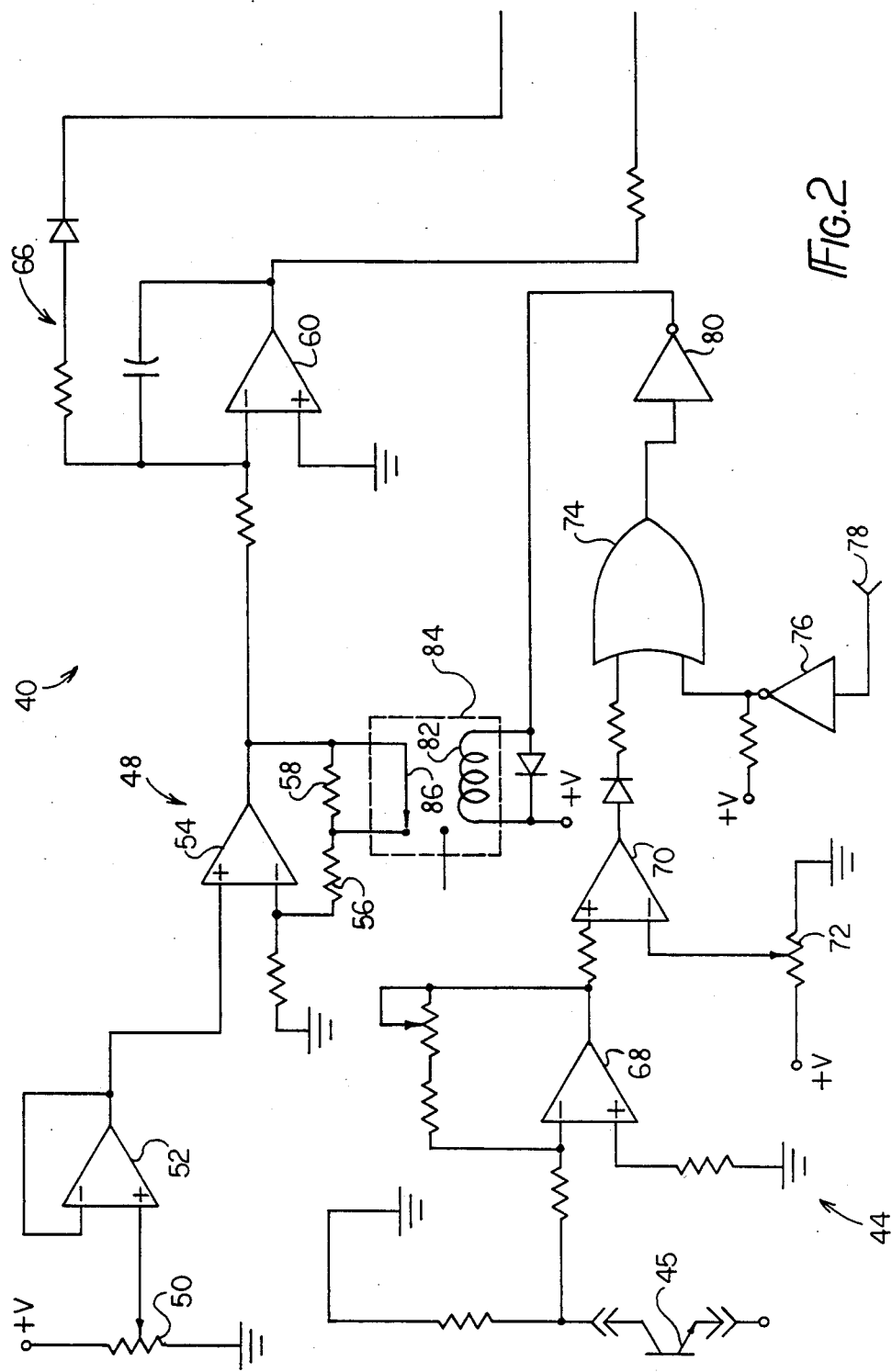
FIGS. 2 and 3 are a schematic diagram of electronic circuitry associated with one embodiment of the present invention.
Figure 3:
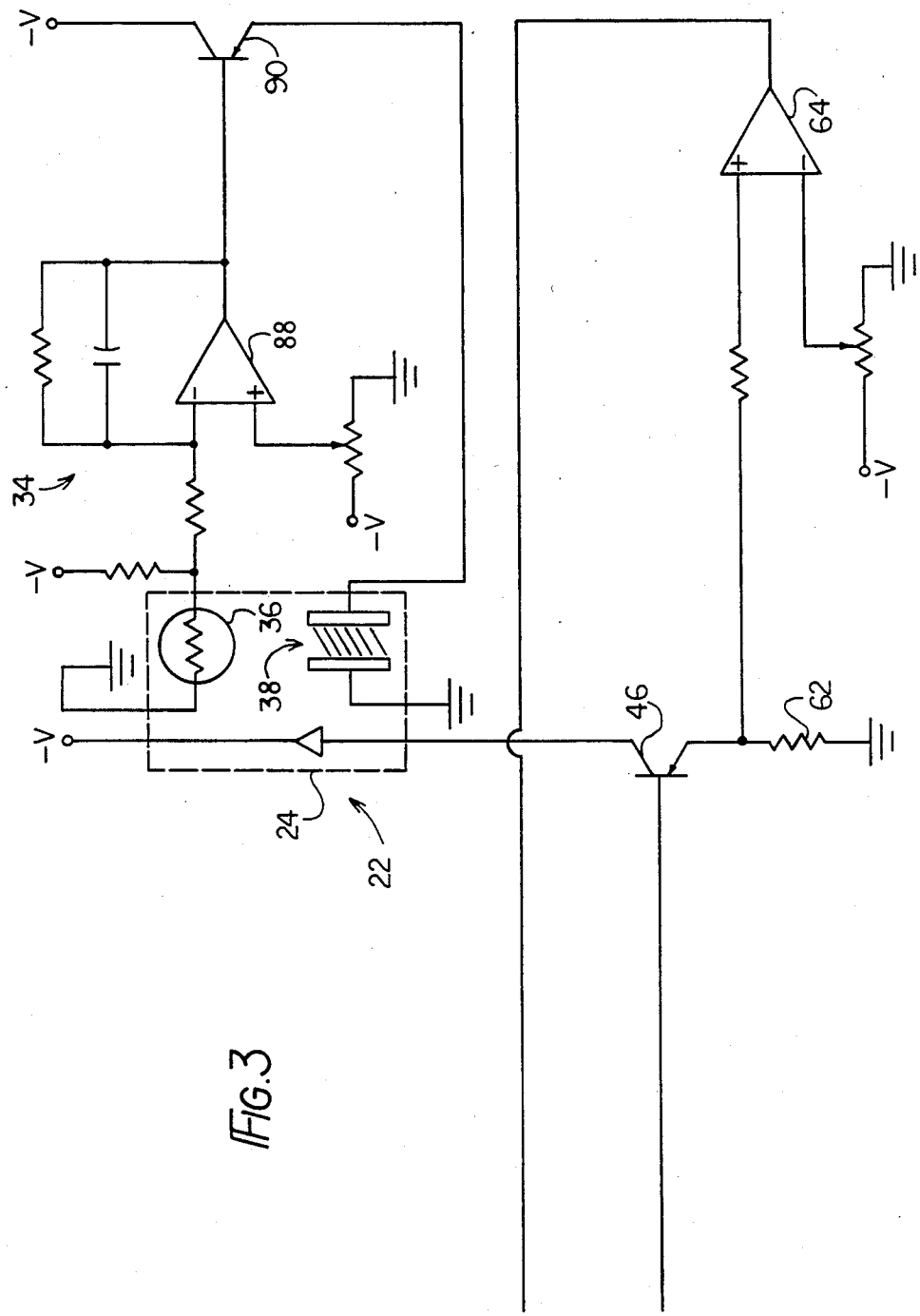

Referring next to FIGS. 2 and 3, a schematic representation of the circuitry associated with one embodiment of the present invention is set forth. The laser 24 is preferably a laser diode serially connected between a supply voltage and circuit ground with a power transistor 46. The power transistor 46 controls the current flow through the laser diode in response to a power control circuit 48 of the laser power control 40. The power control circuit 48 includes a power setpoint potentiometer 50 connected through a voltage follower 52 to a first amplifier 54. The gain of the first amplifier 54 is established in accordance with a pair of feedback resistors 56, 58. The output of the first amplifier 54 is connected to a second amplifier 60 and to the power transistor 46.

A voltage sensing resistor 62 is serially connected between the power transistor 46 and circuit ground. The voltage signal across the resistor 62 is connected to a third amplifier 64, the output of which is connected through a feedback circuit 66 and is summed with the output of the first amplifier 54 at the input of the second amplifier 60. Therefore, the third amplifier 64 acts as a current limit to the power transistor 46.

The detector means 44 includes a photodetector which receives incidental light from, for example, the welding arc, and is connected to the input of a fourth amplifier 68. The fourth amplifier 68 features variable gain and is connected in turn to a comparator 70. The comparator 70 includes an arc light threshold adjustment 72. The output of the comparator 70 is connected to a first input terminal of an "OR" gate 74. A second input terminal of the "OR" gate 74 is connected through an inverter 76 to an input terminal 78 of the circuit 40. The output of the comparator 74 is connected through a second inverter 80 to a coil 82 of a relay 84. A normally closed contact 86 of the relay 84 is connected in parallel with the feedback resistor 58 used in conjunction with the first amplifier 54.

The temperature sensor 36, for example, a thermistor, is located proximate to the laser 24 and is connected to the input of a fifth amplifier 88. The sensor 36 and fifth amplifier 88 are part of the laser thermal control unit 34. The output of the fifth amplifier 88 is connected to a second power transistor 90 which is serially connected between a voltage supply and the thermal electric cooler 38. The cooler 38 is in turn connected to circuit ground.

Industrial Applicability

Operation of the scanning apparatus is best described in conjunction with its use with a welding torch 12 adapted t o produce an arc and a welding torch logic control 14 for controllably operating the welding torch 12. When no arc is being produced by the welding torch 12, it is desirable to operate the laser 24 at a relatively low power in order to conserve the useful life of the laser diode and in order to produce as little unnecessary radiant energy from the laser 24 as possible. Since no arc light is being produced, the signal received by the optical system 28 through the optical filter 32 consists essentially only of the reflected low power laser light and the signal-to-noise ratio is quite high. Therefore, the weld system logic control 14 is able to receive and interpret the reflected low power radiant energy with no difficulty. In this mode, the control system 14 can interpret the type of groove to be welded and can guide the torch 12 around the weld path without actually performing the welding operation. This is a useful mode of operation for set-up and experimentation purposes.

Conversely, in the presence of an arc produced by the torch 12, the radiant energy received by the optical means 28 necessarily incorporates some spurious radiation from the arc. The optical filter 32 removes much of this radiation but is unable to block radiation that coincides with the laser wavelength. Therefore, the signal-to-noise ratio of the signal received by the weld system logic control 14 is decreased considerably from that experienced when no arc is present. Consequently, it is necessary to increase the signal-to-noise ratio by increasing the power of the laser generated radiation striking the workpiece 16. Therefore, it is desirable that the scanning apparatus 18 detect the presence of the arc and adjust the laser power appropriately.

The detector means 44 receives incidental radiant energy that passes through the optical system 28 and the dichromatic mirror 42 and produces first and second status signals in response to the respective absence and presence of the arc-produced radiant energy. Assuming that no arc is present, the signal produced by the detector means 44 is less than the threshold established by the arc light threshold potentiometer 72, and the first status signal is delivered through the "OR" gate 74 and the inverter 80 to the relay coil 82 of the relay 84. The first status signal is insufficient to activate the normally closed contact 86 of the relay 84, and the feedback resistor 58 is effectively removed from the feedback circuit of the first amplifier 54. Consequently, the first amplifier 54 gain is established solely by the resistance of the other feedback resistor 56, and a first power command signal is delivered to the power transistor 46. Responsively, radiant energy having a first relatively low power level is produced by the laser 24.

In response to the presence of the arc, sufficient radiant energy is received by the detector means 44 to overcome the threshold of the comparator 70. Consequently, the second status signal is delivered through the "OR" gate 74 and the inverter 80 to the relay coil 82 of the relay 84. The second status signal is sufficient to cause the normally closed contact 86 to switch to the open position, removing the bypass path around the feedback resistor 58 and increasing the resistance in the feedback loop of the first amplifier 54. The resulting increased gain of the first amplifier 54 causes the second power command signal to be delivered to the power transistor 46. Responsively, radiant energy having a second relatively high power level is produced by the laser 24. Therefore, the power level of the radiant energy produced by the laser 24 is responsive to the absence and presence of the arc produced by the torch 12.

In order to most effectively remove incidental radiant energy that is received by the optical system 28, it is desirable to use an optical filter having as narrow a band-width as possible. However, the band-width must not be so narrow that thermal factors are capable of causing the laser wavelength to drift beyond the range of the pass-band of the optical filter 32. Consequently, in the past, relatively broad band optical filters have been utilized in laser control systems which disadvantageously allowed relatively large amounts of incidental spurious radiation to pass.

The thermal control unit 34, temperature sensor 36, and thermal electric cooler 38 work in conjunction with one another to maintain the laser temperature at a stable predetermined value. By closely controlling the temperature of the laser 24, the potential drift in frequency is minimized and the actual wavelength at which the laser 24 operates can be accurately determined and maintained. Consequently, an optical filter 32 having a very narrow pass-band can be used in the instant embodiment. It has been found that the instant embodiment offers the capability of utilizing an optical filter 32 having a pass-band of ±1.5 nanometers from the predetermined desired wavelength. This narrow pass-band considerably reduces the effect of spurious radiation on the system and further increases the signal-to-noise ratio of the reflected signal received by the weld system logic control 14.

The instant invention advantageously controls the power level of the radiant energy delivered from the laser 24 to the workpiece 16, in response to the absence and presence of an arc produced by the torch 12. In addition, the laser 24 in the instant embodiment is closely temperature controlled in order to maintain its operating wavelength at a constant value within a relatively narrow range. This allows utilizing a narrow band optical filter 32 to improve the signal-to-noise ratio of the scanning apparatus.

Other aspects, objects, advantages, and uses of this invention can be obtained from a study of the drawings, the disclosure, and the appended claims.

We claim:

1. A scanning apparatus for use with an adaptive welding system, said adaptive welding system including a welding torch adapted to produce an arc and a welding torch logic control for controllably operating said welding torch, comprising:
   detector means for sensing radiant energy produced by said arc and producing first and second status signals in response to the respective absence and presence of said arc produced radiant energy;
   logic means for producing a first power command signal in response to receiving said first status signal and a second power command signal in response to receiving said second status signal; and
   emitter means for controllably producing radiant energy having a first power level in response to receiving said first power command signal and a second power level in response to receiving said second power command signal.

2. A scanning apparatus, as set forth in claim 1, wherein said first power level is relatively low and said second power level is relatively high.

3. A scanning apparatus, as set forth in claim 1, wherein said emitter means includes a laser diode.

4. A scanning apparatus, as set forth in claim 3, wherein said emitter means includes thermal control means for maintaining said laser diode at a sufficiently constant predetermined temperature to maintain said laser radiant energy wavelength within a range of plus or minus 1.5 nanometers from a predetermined wavelength.

5. A method for controlling a scanning apparatus used with an adaptive welding system, said adaptive welding system including a welding torch adapted to produce an arc and a welding torch logic control for controllably operating said welding torch, comprising the steps of:
   sensing radiant energy produced by said arc;
   producing first and second status signals in response to the respective sensed absence and presence of said arc produced radiant energy;
   producing a first power command signal in response to receiving said first status signal and a second power command signal in response to receiving said second status signal; and
   controllably producing radiant energy having a first power level in response to receiving said first power command signal and a second power level in response to receiving said second power command signal.

* * * * *